United States Patent
Lemberger et al.

(10) Patent No.: US 6,371,059 B1
(45) Date of Patent: Apr. 16, 2002

(54) THERMOSTATIC VALVE ARRANGED IN A COOLING CIRCUIT OF AN INTERNAL COMBUSTION ENGINE

(75) Inventors: Heinz Lemberger, Unterfoehring; Peter Leu, Ostfildern-Nellingen; Manfred Kurz, Ditzingen, all of (DE)

(73) Assignees: Bayerische Motoren Werke Aktiengesellschaft, Munich; Behr Thermot-tronik GmbH & Co., Kornwestheim, both of (DE)

( * ) Notice: Subject to any disclaimer, the term of this patent is extended or adjusted under 35 U.S.C. 154(b) by 0 days.

(21) Appl. No.: 09/555,272
(22) PCT Filed: Sep. 24, 1999
(86) PCT No.: PCT/EP99/07112
§ 371 Date: May 26, 2000
§ 102(e) Date: May 26, 2000
(87) PCT Pub. No.: WO00/19069
PCT Pub. Date: Apr. 6, 2000

(30) Foreign Application Priority Data

Sep. 29, 1998 (DE) .......................... 198 44 711

(51) Int. Cl.$^7$ ................................. F01P 7/14
(52) U.S. Cl. ................... 123/41.1; 123/41.02
(58) Field of Search .............. 123/41.1, 41.02; 236/34, 34.5, 101 C

(56) References Cited

U.S. PATENT DOCUMENTS 5,385,296 A * 1/1995 Kurz et al. ................ 236/34.5
5,775,270 A * 7/1998 Huemer et al. ............ 123/41.1
5,866,882 A * 2/1999 Saur et al. ................. 219/541
5,996,619 A * 12/1999 Saur et al. ................. 251/118

FOREIGN PATENT DOCUMENTS

DE 30 18 682 C2 5/1980
DE 42 33 913 A1 10/1992

OTHER PUBLICATIONS

"Water Cooling" ICKE Unters Blech, pp. 10–12.

Behr–Thomson Catalog, pp. 1, 3, 4 and 5—Gueltig ab Sep. 1975.

* cited by examiner

*Primary Examiner*—Marguerite McMahon
*Assistant Examiner*—Jason A Benton
(74) *Attorney, Agent, or Firm*—Crowell Moring LLP

(57) ABSTRACT

A thermostatic valve arranged in the coolant circuit of an internal-combustion engine, has a main valve which is acted upon by cold coolant flow on the one side, and by hot coolant flow on the other side. The valve is actuated as a function of the coolant temperature by way of an expansion material element equipped with an electric heating device. To minimize the coldside influence onto the expansion material element, a capsule which stores the expansion material, has an end which limits the expansion material lower at the level of the closed main valve or on the mixing chamber side. At this end, a ring-shaped or sleeve-shaped heating element is arranged coaxially adjacent the control pin, or, individual heating elements are distributed along the circumference of the control pin in an adjacent manner.

6 Claims, 1 Drawing Sheet

THERMOSTATIC VALVE ARRANGED IN A COOLING CIRCUIT OF AN INTERNAL COMBUSTION ENGINE

This application claims the priority of German patent document PP 198 44 711, filed Sep. 29, 1998 and PCT International Application No. PCT/EP99/07112 filed Sep. 24, 1999, the disclosures of which is expressly incorporated by reference herein.

BACKGROUND AND SUMMARY OF THE INVENTION

The invention relates to a thermostatic valve arranged in the coolant circuit of an internal-combustion engine. Known thermostatic valves of the generic type include a main valve which is acted upon cold coolant on the one side, and by hot coolant on the other side, and is actuated as a function of temperature by way of an expansion material element. The expansion material element is coupled in a lift drive connection with the main valve via a control pin which can be moved out/in on the hot or mixing-chamber side, and on its other side is firmly supported by a capsule storing an expansion material, against an abutment in a cold (radiator-return-flow) side connection piece of the thermostatic valve. The capsule, which protrudes on the cold side when the main valve is closed, and penetrates the main valve with clearance of motion, includes an electric film resistor placed in the expansion material as the heating element. The film resistor in the capsule is supported in a heat-insulated manner with respect to the abutment acted upon by cold, and is energized in a controlled/regulated manner by way of connection lines arranged in the abutment.

A thermostatic valve of this type is disclosed in European Patent Document PCT/EP95/05053 with the International Publication Number WO96/19762. To reduce the influence of the cold water when the main valve is closed, in this thermostatic valve the capsule which stores the expansion material is activated into the supporting range on the abutment (which is acted upon cold) by the hot coolant from the mixing chamber of the thermostat. In addition, in this thermostatic valve, a precision resistor is provided in the supporting range as a heating element in thin-film construction. Furthermore, the hot-water chamber, which surrounds the expansion material element on the cold side, has an insulated construction with respect to the cold water.

The disadvantage of this thermostatic valve is the relatively high constructional expenditures which are necessary to reduce the influence of the cold water when the main valve is closed.

German Patent Document DE 295 00 897 U discloses a thermostatic valve in which the cold-water influence on the expansion material element is completely excluded by providing an electrically heatable expansion material element in the mixing chamber, through which at least the warm coolant of the internal-combustion engine flows constantly. However, this further development of the thermostatic valve with a main valve and a short-circuit valve also appears to require high expenditures with respect to construction and space.

It is an object of the present invention to provide an improved thermostatic valve of the above-mentioned type and construction, in which the cold water influence on the expansion material element is reduced significantly while the main valve is closed.

This object by the thermostatic arrangement according to the invention, in which the capsule has an end which limits the expansion material lower at the level of the main valve or on the mixing chamber side. At this end, a ring-shaped or sleeve-shaped heating element is arranged coaxially adjacent to the control pin, or individual heating elements are provided which, in an adjacent manner are distributed along the circumference of the control pin.

German Patent Document DE 1 576 699 A discloses a thermostatic valve which has a main valve that is acted upon by cold coolant in the closed condition. The expansion material element is constructed such that when the main valve is closed, it is stored essentially below this main valve and therefore exclusively on the mixing chamber side. Therefore, the cold water influence is significantly reduced. However, this expansion material element shows no electric heating device.

German Patent Document DE 1 476 445 A describes a thermostatic valve which has an expansion material element in which the level of the expansion material in the expansion material capsule on the mixing chamber side is arranged particularly low with respect to the main valve.

Finally, in European Patent Document EP 0 838 580 A, a thermostatic valve with a main valve acted upon on the cold side has an electric heating element provided in the expansion n material element, away from the side acted upon cold, in the mixing chamber area. While the electric output of the heating element is the same, by means of this arrangement faster and more precise regulation is possible. However, this embodiment has the disadvantage that the connection lines for feeding the electric energy through the hot coolant are guided to the movable end of the expansion material element supported on the cold side. A high-expenditure running of cables is therefore absolutely necessary to avoid cable breaks.

Thus the combination according to the invention of an expansion material level which is relatively low on the mixing chamber side in the capsule, in conjunction with a heating element closely adjacent to the control pin in the area of the mixing chamber, represents an advantageous combination for a further development of the thermostatic valve of the above-mentioned type which has a simpler construction.

Other objects, advantages and novel features of the present invention will become apparent from the following detailed description of the invention when considered in conjunction with the accompanying drawings.

DETAILED DESCRIPTION OF THE DRAWINGS

Figure 1:
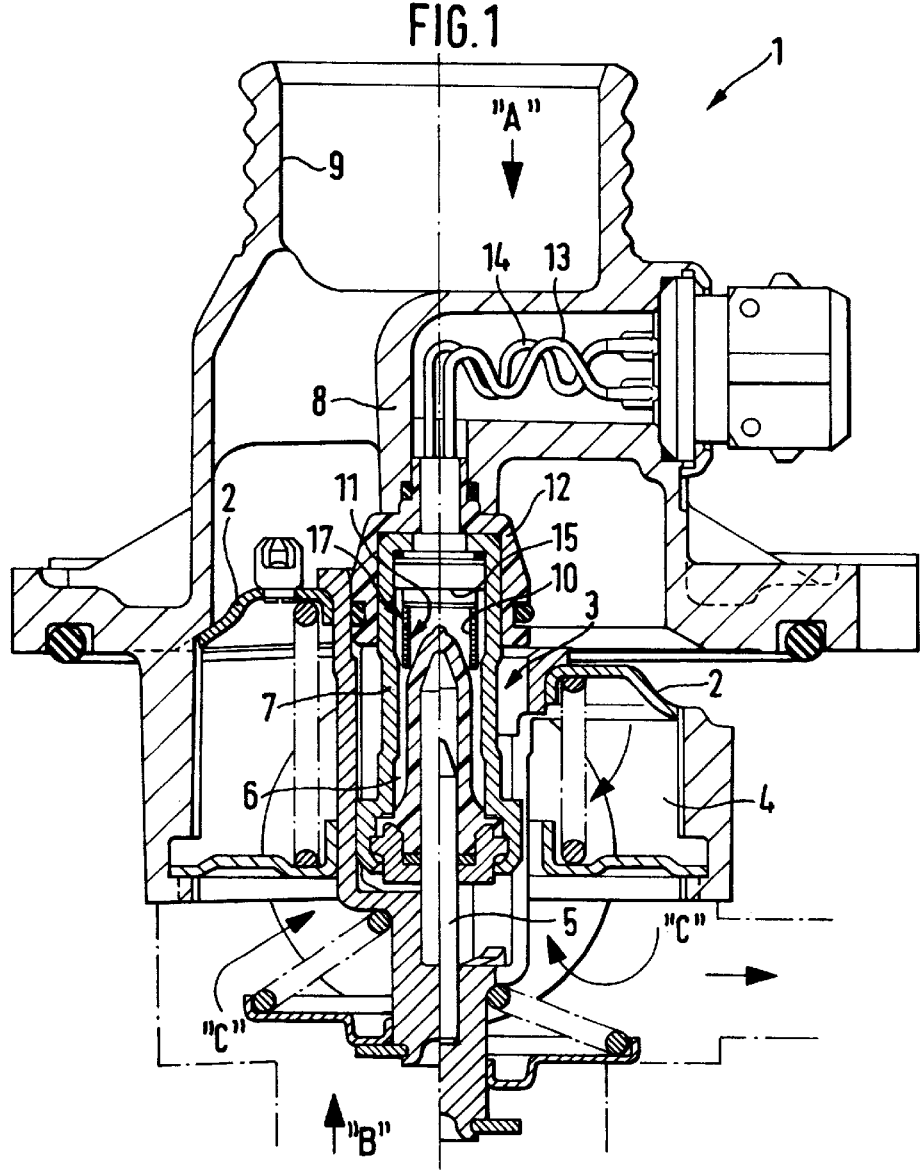
FIG. 1 is a sectional view of a thermostatic valve according to the invention.

In a coolant circuit of an internal-combustion engine (not shown in detail), a thermostatic valve 1 receives a flow of cold coolant coming from a radiator as shown by the arrow A, and a flow of hot coolant which flows out of the internal-combustion engine, as shown by the arrow B. Depending on the position of a main valve 2, either the hot coolant flowing according to arrow B is fed to the internal-combustion engine, without any change of the coolant temperature, or it is mixed with the cold coolant according to arrow A, and fed to the internal-combustion engine, according to arrow C.

Thus, the thermostatic valve 1 has a main valve 2 which is acted upon cold on one side and hot on the other side, and is actuated by way of an expansion material element 3 as a function of the temperature. The expansion material element 3 is in a lift drive connection with the main valve 2 via a control pin 5, which is arranged to move out/in in a mixing chamber 4, as illustrated in the different sectional views in FIG. 1.

As further illustrated in FIG. 1, the expansion material element 3 is firmly supported by a capsule 7 which houses an expansion material 6, against an abutment 8 on the cold-side and radiator-return-flow-side connection piece 9 of the thermostatic valve 1. The capsule 7, which, protrudes on the cold side when the main valve 2 is closed and penetrates the main valve 2 with clearance of motion, includes an electric film resistor 10 placed in the expansion material 6 as the heating element 11. This film resistor 10 in the capsule 7 is supported by a plastic cap 12 in a heat-insulated manner with respect to the abutment 8 acted upon cold, and is energized in a controlled/regulated manner by way of connection lines arranged in the abutment 8.

Figure 2:
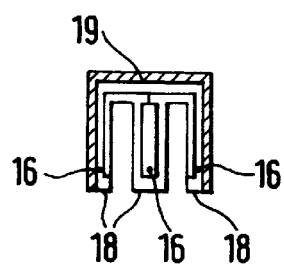
FIG. 2 is a view of embodiment variant of a heating element arrangement according to the invention.

In order to minimize the influence of the cold coolant situated in the connection piece 9 on the heating of the expansion material element 3 when the main valve 2 of the thermostatic valve 1 is closed, according to the invention the capsule 7 has an end 15 which limits the expansion material 6 lower at the level of the closed main valve 2 or on the mixing chamber side. At this end 15, ring-shaped or sleeve-shaped heating element 11 is arranged coaxially adjacent to the control pin 5. In the alternative corresponding to FIG. 2, individual heating elements 16 are distributed along the circumference of the control pin 5 in an adjacent manner.

It is an advantage of the invention that the main valve 2 can be opened rapidly, at a high temperature level of the coolant from the internal-combustion engine, particularly close to a defined temperature limit value, with less electric heating output. According to the invention, this is achieved by the combination of lowering the expansion material level in the direction of the mixing chamber 4 in the expansion material capsule 7 with respect to the closed main valve 2, and heating of the expansion material 6 in direct proximity of the control pin 5. The thermostatic valve 1 is therefore preferably used in the case of a characteristic diagram cooling.

In a preferred embodiment of the invention, a ring-shaped heating element 11 is arranged as a thick-film resistor on a supporting sleeve 17 which is arranged at the end 15 of the expansion material capsule 7. According to another embodiment, a heating element 11 with a metal foil can be provided on the supporting sleeve 17.

In another embodiment, individual heating elements 16 designed as film resistors 10 are provided on arms 18 of a round plate 19 arranged at the end 15 of the expansion material capsule 7.

Another possibility of constructing a sleeve-shaped heating element 11 is the result of the fact that the supporting sleeve 17 or the arms 18 of the round plate 19 are each formed of a material which heats up when energized.

Finally, for a further shortening of the idle regulating time of the expansion material element 3, its expansion material 6 is mixed with a powder (for example, an aluminum powder) which increases its heat conduction.

Concluding, it is also pointed out that by means of the invention better dynamics of the thermostat during the energizing are advantageously achieved, with the advantage of fewer blocking period corrections. Further, a larger temperature spread can be implemented between the upper and lower temperature level. Finally, the flow resistance on the cold water side is reduced by a smaller insulation body in the area of the expansion material element support on the cold-water-side abutment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A thermostatic valve arranged in the coolant circuit of an internal-combustion engine, comprising:

a main valve which is acted upon by cold coolant on a cold side, and by hot coolant, on a hot mixing chamber side, and is actuated between an open position and a closed position, as a function of temperature, by way of an expansion material element;

a control pin which can be moved inward and outward an the mixing-chamber side, and which couples the expansion material element in a lift drive connection with the main valve;

a capsule which houses an expansion material, and which supports said expansion material element against an abutment in a cold-side connection piece, said capsule protruding on the cold side and penetrating the main valve with clearance of motion when the main valve is closed, and including an electric film resistor placed in the expansion material as a heating element; wherein the film resistor in the capsule is supported in a heat-insulated manner with respect to the abutment acted upon cold, and is energized in a controlled manner by way of connection lines arranged in the abutment;

the capsule has an end which limits the expansion material therein to a volume which is disposed substantially entirely on the hot mixing chamber side of the main valve in the closed position; and a ring-shaped or sleeve-shaped heating element is arranged in a coaxially adjacent manner relative to the control pin, or individual heating elements are distributed along the circumference of the control pin in an adjacent manner.

2. The thermostatic valve according to claim 1, wherein the heating elements are arranged as thick film resistors on a supporting sleeve.

3. The thermostatic valve according to claim 1, wherein a heating element with a metal foil is arranged on the supporting sleeve.

4. The thermostatic valve according, to claim 1, wherein the individual heating elements are provided on arms of a round plate arranged at an end of the expansion material capsule (7).

5. The thermostatic valve according to claim 1, wherein the supporting sleeve and the arms of the round plate are in each case formed of a material which heats up when energized.

6. The thermostatic valve according to claim 1, wherein the expansion material is mixed with a powder (aluminum powder) which raises the heat conduction.

* * * * *